United States Patent
Wang et al.

(10) Patent No.: US 12,491,165 B2
(45) Date of Patent: Dec. 9, 2025

(54) LOW TEMPERATURE SILICON OXIDE COATING FOR PHARMACEUTICAL APPLICATIONS

(71) Applicant: Applied Materials, Inc., Santa Clara, CA (US)

(72) Inventors: Fei Wang, Fremont, CA (US); Pravin K. Narwankar, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 49 days.

(21) Appl. No.: 17/955,431

(22) Filed: Sep. 28, 2022

(65) Prior Publication Data

US 2023/0097519 A1 Mar. 30, 2023

Related U.S. Application Data

(60) Provisional application No. 63/250,884, filed on Sep. 30, 2021.

(51) Int. Cl.
*A61K 9/50* (2006.01)

(52) U.S. Cl.
CPC ............ *A61K 9/5089* (2013.01); *A61K 9/501* (2013.01)

(58) Field of Classification Search
None
See application file for complete search history.

(56) References Cited

U.S. PATENT DOCUMENTS

| | | | |
|---|---|---|---|
| 4,289,871 A | 9/1981 | Rowan et al. | |
| 4,522,811 A | 6/1985 | Eppstein et al. | |
| 6,165,512 A | 12/2000 | Mezaache et al. | |
| 6,613,383 B1 | 9/2003 | George et al. | |
| 7,357,910 B2 | 4/2008 | Phillips et al. | |
| 8,524,772 B2 | 9/2013 | Arad et al. | |
| 8,697,097 B2 | 4/2014 | Nonomura et al. | |
| 9,795,576 B2 | 10/2017 | Kolter et al. | |
| 10,166,198 B2* | 1/2019 | Carlsson | A61K 9/5073 |
| 10,373,820 B2 | 8/2019 | Tois et al. | |
| 10,478,402 B2 | 11/2019 | Carlsson et al. | |
| 10,512,796 B2 | 12/2019 | Toledano et al. | |
| 10,603,284 B2 | 3/2020 | Hoppu et al. | |
| 11,174,552 B2 | 11/2021 | Neikirk et al. | |
| 11,180,851 B2 | 11/2021 | Neikirk et al. | |
| 11,242,599 B2 | 2/2022 | Gangakhedkar et al. | |
| 11,311,491 B2 | 4/2022 | Neikirk et al. | |
| 2003/0026989 A1 | 2/2003 | George et al. | |
| 2003/0118642 A1 | 6/2003 | Norman et al. | |
| 2004/0037883 A1 | 2/2004 | Zhou et al. | |
| 2005/0266078 A1 | 12/2005 | Jorda et al. | |
| 2006/0263479 A1 | 11/2006 | Boghani et al. | |
| 2007/0036850 A1 | 2/2007 | Roehrich et al. | |
| 2007/0280895 A1 | 12/2007 | Weimer et al. | |
| 2009/0186968 A1 | 7/2009 | Zong et al. | |
| 2010/0136110 A1 | 6/2010 | Tasaki et al. | |
| 2010/0297251 A1 | 11/2010 | Timmons et al. | |
| 2010/0303722 A1 | 12/2010 | Jin et al. | |
| 2011/0091563 A1 | 4/2011 | Kurasawa et al. | |
| 2011/0300224 A1 | 12/2011 | Murpani et al. | |
| 2012/0201860 A1 | 8/2012 | Weimer et al. | |
| 2013/0202790 A1 | 8/2013 | Li et al. | |
| 2013/0336866 A1 | 12/2013 | Soeger et al. | |
| 2013/0337056 A1 | 12/2013 | Lehtonen et al. | |
| 2015/0250731 A1* | 9/2015 | Hoppu | A61K 9/2009 424/490 |
| 2016/0081945 A1 | 3/2016 | Carlsson et al. | |
| 2017/0007545 A1 | 1/2017 | Hoppu et al. | |
| 2017/0333359 A1 | 11/2017 | Goldstein et al. | |
| 2019/0216742 A1 | 7/2019 | Neikirk et al. | |
| 2019/0279870 A1 | 9/2019 | Mane et al. | |
| 2020/0197313 A1 | 6/2020 | Hoppu et al. | |
| 2020/0338008 A1 | 10/2020 | Wang et al. | |
| 2021/0171416 A1 | 6/2021 | Dameron et al. | |
| 2021/0217609 A1 | 7/2021 | Kagaya | |
| 2021/0378971 A1 | 12/2021 | Wang et al. | |
| 2022/0105048 A1 | 4/2022 | Wang et al. | |
| 2022/0202732 A1 | 6/2022 | Neikirk et al. | |
| 2022/0296530 A1 | 9/2022 | Neikirk | |
| 2023/0059964 A1 | 2/2023 | Hoppu et al. | |
| 2023/0355536 A1 | 11/2023 | Wang et al. | |
| 2023/0364023 A1 | 11/2023 | Wang et al. | |

(Continued)

FOREIGN PATENT DOCUMENTS

| | | |
|---|---|---|
| CN | 107281152 A | 10/2017 |
| DE | 10307568 | 9/2004 |
| EP | 1621187 | 2/2006 |

(Continued)

OTHER PUBLICATIONS

Choi et al. (Rapid vapor deposition SiO2 thin film deposited at a low temperature using tris(tert-pentoxy)silanol and trimethyl-aluminum, Materials Chemistry and Physics, 2013) (Year: 2013).*
Singh et al. (Area-Selective Atomic Layer Deposition of Metal Oxides on Noble Metals through Catalytic Oxygen Activation, Chem. Mater., 2018) (Year: 2018).*
Johnson et al. (A brief review of atomic layer deposition: from fundamentals to applications, Materials Today, 2014) (Year: 2014).*
Andrew et al., "Sustained Release of a Monoclonal Antibody from Electrochemically Prepared Mesoporous Silicon Oxide," Advanced Functional Materials, Dec. 2010, 20(23):4168-4174.
Arin et al., "Characterization of ZnO-TiO2 and zinc titanate nanoparticles synthesized by hydrothermal process," Res Chem Intermed, 2017, 43:3183-3195.
Arl et al., "SiO2 thin film growth through a pure atomic layer deposition technique at room temperature," Royal Society of Chemistry, May 2020, 10:18073-18081.

(Continued)

*Primary Examiner* — Brian-Yong S Kwon
*Assistant Examiner* — Danielle Kim
(74) *Attorney, Agent, or Firm* — Fish & Richardson P.C.

(57) ABSTRACT

This disclosure pertains to coated drug compositions and methods of preparing coated drug compositions with a low temperature silicon oxide coating. Specifically, the instant application discloses a method to coat active pharmaceutical ingredient particles using a silicon precursor and a catalyst at a low temperature.

19 Claims, 9 Drawing Sheets

(56) References Cited

U.S. PATENT DOCUMENTS

2024/0226018 A1  7/2024  Hoppu et al.

FOREIGN PATENT DOCUMENTS

| | | |
|---|---|---|
| IN | 802MUM2000 | 2/2005 |
| JP | 2004-269384 | 9/2004 |
| JP | 2005-060309 | 3/2005 |
| JP | 2005-520796 | 7/2005 |
| JP | 2008-013480 | 1/2008 |
| JP | 2008-539801 | 11/2008 |
| JP | 2010-501538 | 1/2010 |
| JP | 2011-063627 | 3/2011 |
| JP | 2012-051810 | 3/2012 |
| JP | 2014-510066 | 4/2014 |
| JP | 2015-528487 | 9/2015 |
| JP | 2016-519155 | 6/2016 |
| KR | 10-20140011358 | 1/2014 |
| KR | 10-20160013050 | 2/2016 |
| KR | 10-20160090478 | 8/2016 |
| KR | 10-20170094046 | 8/2017 |
| WO | WO 1990/002546 | 3/1990 |
| WO | WO 1996/22030 | 7/1996 |
| WO | WO 2005/044224 | 5/2005 |
| WO | WO 2006/090640 | 8/2006 |
| WO | WO 2007/015243 | 2/2007 |
| WO | WO 2008/023184 | 2/2008 |
| WO | WO 2010/135107 | 11/2010 |
| WO | WO 2011/011207 | 1/2011 |
| WO | WO 2011/141486 | 11/2011 |
| WO | WO 2012/116814 | 9/2012 |
| WO | WO 2019/143744 | 7/2019 |
| WO | WO 2020/219583 | 10/2020 |

OTHER PUBLICATIONS

Groner et al., "Low-temperature Al2O3 atomic layer deposition," Chemistry of Materials, Chemistry of Materials, American Chemical Society, US, Feb. 24, 2004, 16(4):639-645.

Kaariainen et al., "Surface modification of acetaminophen particles by atomic layer deposition," International Journal of Pharmaceutics, Apr. 18, 2017, 525(1):160-174.

Klaus et al., "SiO2 Chemical Vapor Deposition at Room Temperature Using SiCl4 and H2O with an NH 3 Catalyst," Journal of the Electrochemical Society, 2000, 147(7):2658-2664.

Knez et al., "Synthesis and Surface Engineering of Complex Nanostructures by Atomic Layer Deposition," Advanced Materials, Nov. 5, 2007, 19(21):3425-3438.

Knez et al., "Atomic Layer Deposition on Biological Macromolecules: Metal Oxide Coating of Tobacco Mosaic Virus and Ferritin," Nano Letters, 2006, 6(6):1172-1177.

Li et al., "Nanoparticle Multilayers: Surface Modification of Photosensitive Drug Microparticles for Increased Stability and in Vitro Bioavailability," Journal of Nanoscience and Nanotechnology, Sep. 2006, 6(9-10):3252-3260.

Martino et al., "A new pure paracetamol for direct compression: The orthorhombic form," International Journal of Pharmaceutics, 1996, 128:1-8.

Pharmaceutical Preparations, European Pharmacopoeia 8.0, Apr. 2013, 756-758.

Patel et al., "Ensuring Better Control of Granulation," Pharmaceutical Manufacturing, Aug. 7, 2008, http://www.pharmamanufacturing/com/articles/2008/096/, 11 pages.

Prescott et al., "On Powder Flowability," Pharmaceutical Technology, Oct. 2000, 14 pages.

Shah et al., "Comparative Evaluation of Flow for Pharmaceutical Powders and Granules," AAPS PharmSciTech, 2008, 9(1):250-258.

Siddiqi et al., "Properties of Zinc Oxide Nanoparticles and Their Activity Against Microbes," Nanoscale Research Letters, 2018, 13:141, 13 pages.

Singh et al., "Microencapsulation: A promising technique for controlled drug delivery," Res. Pharnn. Sci., 2010, 5(2):65-77.

Verheezen et al., "Milling of agglomerates in an impact mill," Int J. Pharm., 2004, 278:165-172.

wikipedia.com [online], "Titanium Oxide," retrieved on Aug. 20, 2021, retrieved from URL <https://en.wikipedia.org/wiki/Titanium_oxide>, 1 page.

Wu et al., "Preparation and properties of composite particles made by nano zinc oxide coated with titanium dioxide," J. Mater. Sci., 2006, 41:5845-5850.

www.ahdictionary.com [online], "Granule," retrieved on Aug. 9, 2019, retrieved from URL <https:www.ahdictionary.com/word/search/html?q=granule>, 3 pages.

Xie et al., "Atomic layer deposition of TiO2 from tetrakis-dimethyl-amido titanium or Ti isopropoxide precursors and H2O," Journal of Applied Physics, 2007, 102:7 pages.

Balaji et al., "Nano-zirconia-Evaluation of its antioxidant and anticancer activity," Journal of Photochemistry & Photobiology, B: Biology, May 1, 2017, 170: 125-133.

Kääriäinen et al., "Surface modification of acetaminophen particles by atomic layer deposition," International Journal of Pharmaceutics, Jun. 15, 2017, 525(1):160-74.

Choi et al., "Rapid vapor deposition SiO2 thin film deposited at a low temperature using tris (tert-pentoxy) silanol and trimethyl-aluminum," Materials Chemistry and Physics, Nov. 15, 2013, 142(2-3):614-8.

International Search Report and Written Opinion in International Appln. No. PCT/US2022/077191, mailed on Jan. 27, 2023, 10 pages.

Li et al., "Oxide bioceramics: inert ceramic materials in medicine and dentistry," Handbook of Biomaterial Properties, 1998, 4 pages.

Mftah et al., "Physicochemical properties, cytotoxicity, and antimicrobial activity of sulphated zirconia nanoparticles," International Journal of Nanomedicine, 2015:10 765-774.

Won et al., "Effect of Catalyst Layer Density and Growth Temperature in Rapid Atomic Layer Deposition of Silica Using Tris (tert-pentoxy) silanol," ACS Applied Materials & Interfaces, May 25, 2011, 3(5):1633-9.

Zirconia Biomaterials, Arya(ed)., 2022, 4 pages.

Hakim et al., "Conformal nanocoating of zirconia nanoparticles by atomic layer deposition in a fluidized bed reactor," Nanotechnology, 2005, 16:S375-S381.

Huo et al., "Pre-Treatment with Zirconia Nanoparticles Reduces Inflammation Induced by the Pathogenic H5N1 Influenza Virus," International Journal of Nanomedicine, 2020, 15:661-674.

Azad et al., "Impact of Critical Material Attributes (CMAs)-Particle Shape on Miniature Pharmaceutical Unit Operations," AAPS PharmSciTech, Apr. 2021, 22(3):1-11.

Lee et al., "Low temperature atomic layer deposition of SiO2 thin films using diisopropylaminosilane and ozone," Ceramics International, Feb. 1, 2017, 43(2):2095-2099.

Nam et al., "Low-temperature, high-growth-rate ALD of SiO2 using aminodisilane precursor," Applied Surface Science, Aug. 15, 2019, 485:381-390.

Li et al, "Micro and Nano Powder Post-Processing Technology and Application," Defense Industry Press, Sep. 2005, pp. 315-318 (with English translation).

Xu et al., "China's Strategic Emerging Industries: New Materials. High-Performance Separation Membrane Materials," China Railway Press, Dec. 2017, p. 60 (with English translation).

Wu et al., "Optical and Electrical Properties of Al-doped ZnO Thin Films by Atomic Layer Deposition," Journal of Materials Science: Materials in Electronics, Aug. 31, 2020, 31:17365-17374.

Zhao et al., "Investigation on Transparent, Conductive ZnO:Al Films Deposited by Atomic Layer Deposition Process," Nanomaterials, Jan. 5, 2022, 12(1):1-10.

U.S. Appl. No. 18/212,599, filed Jun. 21, 2023, Frankel et al.

Johnson et al., "A brief review of atomic layer deposition: from fundamentals to applications," Materials Today, 2014, 17(5):236-246.

Lee et al., "Effect of the pressure on the chemical vapor deposition of copper from copper hexafluoracetylacetoneate trimethylvinylsilane," Thin Solid Films, 1997, 305:254-258.

(56) References Cited

OTHER PUBLICATIONS

European Search Report in Appln. No. 22877534.2, mailed on Jul. 8, 2025, 8 pages.
picosun.com [online] "Biocompatible ALD coatings for pharmaceuticals," Picosun, Jan. 1, 2020, retrieved from URL <https://f.hubspotusercontent00.net/hubfs/20135258/Application%20notes%20PDFs/Pharmaceuticals%20-%2011032020%20final.pdf>, 1-4.

* cited by examiner

LOW TEMPERATURE SILICON OXIDE COATING FOR PHARMACEUTICAL APPLICATIONS

CROSS-REFERENCE TO RELATED APPLICATIONS

This application claims the benefit of priority to U.S. Application No. 63/250,884, filed on Sep. 30, 2021, the contents of which are hereby incorporated by reference.

TECHNICAL FIELD

This disclosure pertains to coated drug compositions and methods of preparing coated drug compositions with a silicon oxide coating at low temperature.

BACKGROUND

It is of great interest to the pharmaceutical industry to develop improved formulations of active pharmaceutical ingredients (APIs). Formulation can influence the stability and bioavailability of the APIs as well as other characteristics. Formulation can also influence various aspects of drug product (DP) manufacture, for example, the ease and safety of the manufacturing process.

Recently, we have demonstrated that a metal oxide coating can be applied to API particles using atomic layer coating (ALC). The suitable metal oxide can be aluminum oxide, titanium oxide or zinc oxide.

In the manufacture of drug products, it is also desirable to coat API particles and particles containing API using silicon oxide, a well-accepted inert material, in order to improve the stability and bioavailability of the API. However, in the field of consumer electronics, a silicon oxide coating is usually applied at a high temperature. It is also desirable to coat the API particles at a relatively low temperature in order to minimize the damage to the API.

SUMMARY

In one aspect, the disclosure relates to a method of preparing a pharmaceutical composition comprising coated particles comprising an active pharmaceutical ingredient (API) enclosed by one or more silicon oxide layers, the method comprising the sequential steps of: (a) Providing uncoated particles comprising an API; (b1) Loading the particles comprising the API into a reactor; (b2) Applying a vaporous or gaseous catalyst to the particles in the reactor by pulsing the vaporous or gaseous catalyst into the reactor; (b3) Performing one or more pump-purge cycles of the reactor using an inert gas; (b4) Applying a vaporous or gaseous silicon precursor to the particles in the reactor by pulsing the vaporous or gaseous silicon precursor into the reactor; (b5) Performing one or more pump-purge cycles of the reactor using an inert gas; (c) Processing the coated particles to prepare a pharmaceutical composition.

In some embodiments, the uncoated particles are crystalline.

In some embodiments, the silicon oxide coating constitutes at least 5% of the total weight of the coated particles.

In some embodiments, the API is an organic compound.

In some embodiments, steps (b2)-(b5) are performed at least four times (e.g., 5, 10, 15, 20, 25 or more times) providing a first, second, third and fourth cycle, etc.

In some embodiments, a subset of vapor or gaseous content is pumped out prior to step (b3) and/or step (b5).

In some embodiments, the silicon oxide layer on the coated particles has a thickness in the range of 0.1 nm to 120 nm.

In some embodiments, the silicon oxide layer on the coated particles has a thickness in the range of 50 nm to 120 nm.

In some embodiments, step (c) comprises combining the coated particles with one or more pharmaceutically acceptable excipients.

In some embodiments, steps (b2)-(b5) takes place at a temperature between 25° C. and 100° C.

In some embodiments, steps (b2)-(b5) takes place at a temperature between 40° C. and 80° C.

In some embodiments, steps (b2)-(b5) takes place at a temperature between 40° C. and 40° C.

In some embodiments, steps (b2)-(b5) takes place at a temperature between 25° C. and 40° C.

In some embodiments, step (b4) comprises two or more micro-pulses.

In some embodiments, step (b4) comprises a holding time in the range of 1 minute to 1 hour.

In some embodiments, step (b2) comprises a holding time in the range of 5 seconds to 20 seconds.

In some embodiments, the catalyst in step (b2) is trimethylaluminium (TMA).

In some embodiments, the silicon precursor in step (b4) is Tris(tert-pentoxy)silanol (TPS).

In some embodiments, step (b1) further comprises agitating the API.

In one aspect, the disclosure relates to pharmaceutical composition prepared by the method described herein.

In some embodiments, the silicon oxide coating do not comprise any chloride or HCl.

In some embodiments, the silicon oxide layer on the coated particles comprises less than 15% aluminum.

Described herein is a method of preparing a pharmaceutical composition by coating API particles with silicon oxide at a low temperature, the method comprising the sequential steps of: (a) providing particles comprising or consisting of an API; (b) performing atomic layer coating to apply a silicon oxide layer to the particles thereby preparing coated particles comprising or consisting of an API enclosed by silicon oxide; and (c) processing the coated particles to prepare a pharmaceutical composition.

In various embodiments: the step of performing atomic layer coating comprises:
- (b1) loading the particles comprising the drug into a reactor;
- (b2) applying a vaporous or gaseous catalyst to the particles in the reactor;
- (b3) performing one or more pump-purge cycles of the reactor using inert gas;
- (b4) applying a vaporous or gaseous silicon precursor to the particles in the reactor; and
- (b5) performing one or more pump-purge cycles of the reactor using inert gas.

Unless otherwise defined, all technical and scientific terms used herein have the same meaning as commonly understood by one of ordinary skill in the art to which this invention belongs. Methods and materials are described herein for use in the present invention; other suitable methods and materials known in the art can also be used. The materials, methods, and examples are illustrative only and not intended to be limiting.

Other features and advantages of the invention will be apparent from the following detailed description and figures, and from the claims.

BRIEF DESCRIPTION OF THE DRAWINGS

FIG. 3A shows the cross-section TEM image of TPS-32 (API-1) and FIG. 3B shows the cross-section TEM image of TPS-35 (API-2).

DETAILED DESCRIPTION

The present disclosure provides methods of preparing pharmaceutical compositions comprising particles comprising an API coated with silicon oxide. The coating is of controlled thickness. Because the coating is relatively thin, drug products with high drug loading can be produced. For example, the silicon oxide layer can have a thickness in range of 0.1 nm to 100 nm. Finally, there are benefits with respect to cost and ease of manufacture because multiple coatings can be applied in the same reactor.

Drug

The term "drug," in its broadest sense includes all small molecule (e.g., non-biologic) APIs, in particular APIs that are organic molecules. The drug could be selected from the group consisting of an analgesic, an anesthetic, an anti-inflammatory agent, an anthelmintic, an anti-arrhythmic agent, an antiasthma agent, an antibiotic, an anticancer agent, an anticoagulant, an antidepressant, an antidiabetic agent, an antiepileptic, an antihistamine, an antitussive, an antihypertensive agent, an antimuscarinic agent, an antimycobacterial agent, an antineoplastic agent, an antioxidant agent, an antipyretic, an immunosuppressant, an immunostimulant, an antithyroid agent, an antiviral agent, an anxiolytic sedative, a hypnotic, a neuroleptic, an astringent, a bacteriostatic agent, a beta-adrenoceptor blocking agent, a blood product, a blood substitute, a bronchodilator, a buffering agent, a cardiac inotropic agent, a chemotherapeutic, a contrast media, a corticosteroid, a cough suppressant, an expectorant, a mucolytic, a diuretic, a dopaminergic, an antiparkinsonian agent, a free radical scavenging agent, a growth factor, a haemostatic, an immunological agent, a lipid regulating agent, a muscle relaxant, a parasympathomimetic, a parathyroid calcitonin, a biphosphonate, a prostaglandin, a radio-pharmaceutical, a hormone, a sex hormone, an anti-allergic agent, an appetite stimulant, an anoretic, a steroid, a sympathomimetic, a thyroid agent, a vaccine, a vasodilator and a xanthine.

Exemplary types of small molecule drugs include, but are not limited to, acetaminophen, clarithromycin, azithromycin, ibuprofen, fluticasone propionate, salmeterol, pazopanib HCl, palbociclib, and amoxicillin potassium clavulanate.

Atomic Layer Coating (ALC)

In the atomic layer coating method (also referred to as atomic layer deposition (ALD)), a thin film coating is formed on the surface of a particle by depositing successive molecule layers of one or more coating materials.

Reactor System

The term "reactor system" in its broadest sense includes all systems that could be used to perform ALC. An exemplary reactor system is illustrated in FIG. 1 and further described below.

Figure 1:
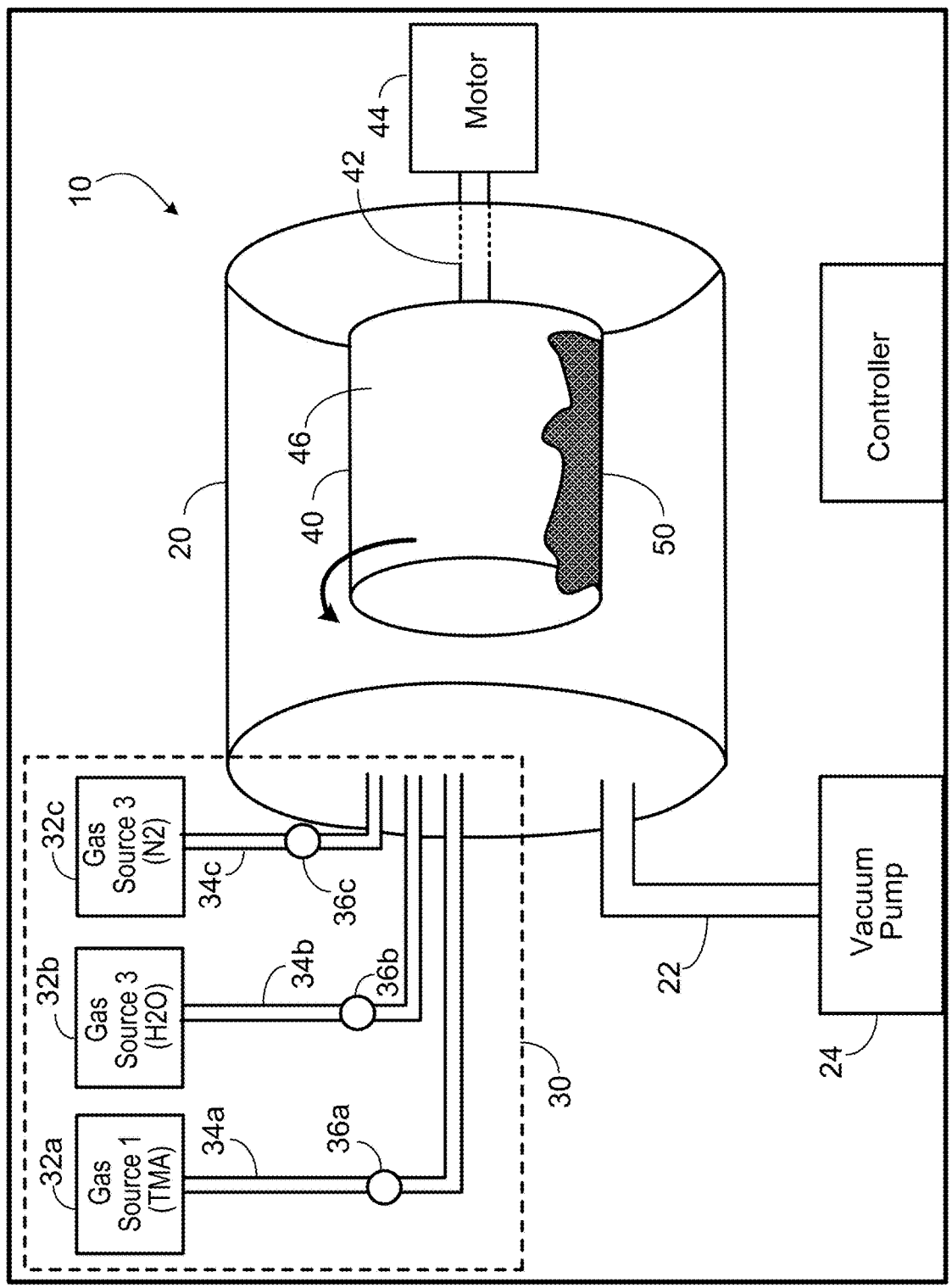
FIG. 1 is a schematic illustration of a rotary reactor for ALC coating of particles comprising an active pharmaceutical ingredient.

FIG. 1 illustrates a reactor system 10 for performing coating of particles, with thin-film coatings. The reactor system 10 can perform ALC coating. The reactor system 10 permits ALC coating to be performed at higher (above 50° C., e.g., 50-100° C. or higher) or lower processing temperature, e.g., below 50° C., e.g., at or below 35° C. For example, the reactor system 10 can form thin-film silicon oxide on the particles primarily by ALC at temperatures of 40-80° C., e.g., 40° C. or 80° C. In general, the particles can remain or be maintained at such temperatures. This can be achieved by having the catalyst and the silicon precursor gases and/or the interior surfaces of the reactor chamber (e.g., the chamber 20 and drum 40 discussed below) remain or be maintained at such temperatures.

Again, illustrating an ALC process, the reactor system 10 includes a stationary vacuum chamber 20 which is coupled to a vacuum pump 24 by vacuum tubing 22. The vacuum pump 24 can be an industrial vacuum pump sufficient to establish pressures less than 1 Torr, e.g., 1 to 100 mTorr, e.g., 50 mTorr. The vacuum pump 24 permits the chamber 20 to be maintained at a desired pressure and permits removal of reaction byproducts and unreacted process gases.

In operation, the reactor 10 performs the ALC thin-film coating process by introducing a gaseous catalyst and silicon precursor into the chamber 20. The gaseous catalyst and silicon precursor are spiked alternatively into the reactor. This permits the ALC process to be carried out without the need for water, ozone or a high energy plasma. In addition, the ALC reaction can be performed at low temperature conditions, such as below 80° C., e.g., below 50° C.

The chamber 20 is also coupled to a chemical delivery system 30. The chemical delivery system 30 includes three or more gas sources 32a, 32b, 32c coupled by respective delivery tubes 34a, 34b, 34c and controllable valves 36a, 36b, 36c to the vacuum chamber 20. The chemical delivery system 30 can include a combination of restrictors, gas flow controllers, pressure transducers, and ultrasonic flow meters to provide controllable flow rate of the various gasses into the chamber 20. The chemical delivery system 30 can also include one or more temperature control components, e.g., a heat exchanger, resistive heater, heat lamp, etc., to heat or cool the various gasses before they flow into the chamber 20. Although FIG. 1 illustrates separate gas lines extending in parallel to the chamber for each gas source, two or more of the gas lines could be joined, e.g., by one or more three-way valves, before the combined line reaches the chamber 20.

One of the gas sources can provide a catalyst. In particular, a gas source can provide a vaporous or gaseous catalyst. For example, the catalyst can be trimethylaluminium (TMA).

One of the gas sources can provide a purge gas. In particular, the third gas source can provide a gas that is chemically inert to the catalyst and silicon precursor, the coating, and the particles being processed. For example, the purge gas can be $N_2$, or a noble gas, such as argon.

A rotatable coating drum 40 is held inside the chamber 20. The drum 40 can be connected by a drive shaft 42 that extends through a sealed port in a side wall of the chamber 20 to a motor 44. The motor 44 can rotate the drum at speeds of 1 to 100 rpm. Alternatively, the drum can be directly connected to a vacuum source through a rotary union.

The particles to be coated, shown as a particle bed 50, are placed in an interior volume 46 of the drum 40. The drum 40 and chamber 20 can include sealable ports (not illustrated) to permit the particles to be placed into and removed from the drum 40.

The body of the drum 40 is provided by one or more of a porous material, a solid metal, and a perforated metal. The pores through the cylindrical side walls of the drum 40 can have a dimension of 10 μm.

In operation, one of the gasses flows into chamber 20 from the chemical delivery system 30 as the drum 40 rotates. A combination of pores (1-100 um), holes (0.1-10 mm), or large openings in the coating drum 40 serve to confine the particles in the coating drum 40 while allowing rapid delivery of precursor chemistry and the pumping of byproducts or unreacted species. Due to the pores in the drum 40, the gas can flow between the exterior of the drum 40, i.e., the reactor chamber 20, and the interior of the drum 40. In addition, rotation of the drum 40 agitates the particles to keep them separate, ensuring a large surface area of the particles remains exposed. This permits fast, uniform interaction of the particle surface with the process gas.

In some implementations, one or more temperature control components are integrated into the drum 40 to permit control of the temperature of the drum 40. For example, a resistive heater, a thermoelectric cooler, or other component can be in or on the side walls of the drum 40.

The reactor system 10 also includes a controller 60 coupled to the various controllable components, e.g., vacuum pump 24, gas distribution system 30, motor 44, a temperature control system, etc., to control operation of the reactor system 10. The controller 60 can also be coupled to various sensors, e.g., pressure sensors, flow meters, etc., to provide closed loop control of the pressure of the gasses in the chamber 20.

In general, the controller 60 can operate the reactor system 10 in accord with a "recipe." The recipe specifies an operating value for each controllable element as a function of time. For example, the recipe can specify the times during which the vacuum pump 24 is to operate, the times of and flow rate for each gas source 32a, 32b, 32c, the rotation rate of the motor 44, etc. The controller 60 can receive the recipe as computer-readable data (e.g., that is stored on a non-transitory computer readable medium).

The controller 60 and other computing device parts of systems described herein can be implemented in digital electronic circuitry, or in computer software, firmware, or hardware. For example, the controller can include a processor to execute a computer program as stored in a computer program product, e.g., in a non-transitory machine-readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment. In some implementations, the controller 60 is a general-purpose computer. In some implementations, the controller can be implemented using special purpose logic circuitry, e.g., an FPGA (field programmable gate array) or an ASIC (application specific integrated circuit).

Operation

Initially, particles are loaded into the drum 40 in the reactor system 10. The particles can be purely particles of a drug (or a combination of particles of a first drug and a second drug) or a mixture of particles of a drug (or a combination of particles of a first drug and a second drug) and particles of an excipient. In some cases, the particles are composed of one or more drugs (e.g., one of the drugs discussed above) and one or more excipients. Once any access ports are sealed, the controller 60 operates the reactor system 10 according to the recipe in order to form the thin-film silicon oxide on the particles.

In particular, the catalyst and the silicon precursor are alternately supplied to the chamber 20, with each step of supplying a catalyst or the silicon precursor followed by a purge cycle in which the inert gas is supplied to the chamber 20 to force out the excessive catalyst or silicon precursor and by-products used in the prior step. Moreover, one or more of the gases (e.g., catalyst and/or silicon precursor gases and/or the inert gas) can be supplied in pulses in which the chamber 20 is filled with the gas to a specified pressure, a holding time is permitted to pass, and the chamber is evacuated by the vacuum pump 24 before the next pulse commences.

In particular, the controller 60 can operate the reactor system 10 as follows.

In a catalyst half-cycle, while the motor 44 rotates the drum 40 to agitate the particles 50:
  i) The gas distribution system 30 is operated to flow the catalyst gas, e.g., TMA, from the source 32a into the chamber 20 until a first specified pressure is achieved. The specified pressure can be 0.1 Torr to half of the saturation pressure of the catalyst gas.
  ii) Flow of the catalyst is halted, and a specified holding time is permitted to pass, e.g., as measured by a timer in the controller. This permits the catalyst to flow through the particle bed in the drum 40 and react with the surface of the particles 50 inside the drum 40.
  iii) The vacuum pump 50 evacuates the chamber 20, e.g., down to pressures below 1 Torr, e.g., to 1 to 100 mTorr, e.g., 50 mTorr.

Next, in a first purge cycle, while the motor 44 rotates the drum to agitate the particles 50:
  iv) The gas distribution system 30 is operated to flow the inert gas, e.g., $N_2$, from the source 32c into the chamber 20 until a second specified pressure is achieved. The second specified pressure can be 1 to 100 Torr.
  v) Flow of the inert gas is halted, and a specified delay time is permitted to pass, e.g., as measured by the timer in the controller. This permits the inert gas to flow through the pores in the drum 40 and diffuse through the particles 50 to displace the catalyst gas and any vaporous by-products.
  vi) The vacuum pump 50 evacuates the chamber 20, e.g., down to pressures below 1 Torr, e.g., to 1 to 500 mTorr, e.g., 50 mTorr.

These steps (iv)-(vi) can be repeated a number of times set by the recipe, e.g., six to twenty times, e.g., sixteen times.

In a silicon precursor half-cycle, while the motor 44 rotates the drum 40 to agitate the particles 50:
  vii) The gas distribution system 30 is operated to flow the silicon precursor, e.g., TPS, from the source 32a into the chamber 20 until a third specified pressure is achieved. The third pressure can be 0.1 Torr to half of the saturation pressure of the silicon precursor gas.

viii) Flow of the silicon precursor is halted, and a specified holding time is permitted to pass, e.g., as measured by the timer in the controller. This permits the silicon precursor to flow through the pores in the drum 40 and react with the surface of the particles 50 inside the drum 40.

ix) The vacuum pump 50 evacuates the chamber 20, e.g., down to pressures below 1 Torr, e.g., to 1 to 500 mTorr, e.g., 50 mTorr.

These steps (vii)-(ix) can be repeated a number of times set by the recipe, e.g., two to ten times, e.g., six times.

Next, a second purge cycle is performed. This second purge cycle can be identical to the first purge cycle, or can have a different number of repetitions of the steps (iv)-(vi) and/or different delay time and/or different pressure.

The cycle of the catalyst half-cycle, first purge cycle, silicon precursor half cycle and second purge cycle can be repeated a number of times set by the recipe, e.g., one to ten times.

As noted above, the coating process can be performed at low processing temperature, e.g., below 80° C., e.g., at or below 50° C. In particular, the particles can remain or be maintained at such temperatures during all of steps (i)-(ix) noted above. In general, the temperature of the interior of the reactor chamber does not exceed 40° C. during of steps (i)-(ix). This can be achieved by having the catalyst gas, silicon precursor gas and inert gas be injected into the chamber at such temperatures during the respective cycles. In addition, physical components of the chamber can remain or be maintained at such temperatures, e.g., using a cooling system, e.g., a thermoelectric cooler, if necessary.

Process for Preparing Pharmaceutical Compositions Comprising Drugs Encapsulated by Silicon Oxide Provided are two exemplary methods for a pharmaceutical composition comprising a drug-containing core enclosed by silicon oxide. The first exemplary method includes the sequential steps of: (a) loading the particles comprising the drug into a reactor, (b) applying a vaporous or gaseous catalyst to the substrate in the reactor, (c) performing one or more pump-purge cycles of the reactor using inert gas, (d) applying a vaporous or gaseous silicon precursor to the substrate in the reactor (e.g., comprising at least two pulses), and (e) performing one or more pump-purge cycles of the reactor using inert gas. In some embodiments of the first exemplary method, the sequential steps (b)-(e) are optionally repeated one or more times to increase the total thickness of the silicon oxide that enclose the solid core of the coated particles. In some embodiments, the reactor pressure is allowed to stabilize following step (a), step (b), and/or step (d). In some embodiments, the reactor contents are agitated prior to and/or during step (b), step (c), and/or step (e). In some embodiments, a subset of vapor or gaseous content is pumped out prior to step (c) and/or step (e).

The second exemplary method includes (e.g., consists of) the sequential steps of (a) loading the particles comprising the drug into a reactor, (b) reducing the reactor pressure to less than 1 Torr, (c) agitating the reactor contents until the reactor contents have a desired moisture content, (d) pressurizing the reactor to at least 1 Torr by adding a vaporous or gaseous catalyst, (e) allowing the reactor pressure to stabilize, (f) agitating the reactor contents, (g) pumping out a subset of vapor or gaseous content and determining when to stop pumping based on analysis of content in reactor, (h) performing a sequence of pump-purge cycles of the reactor using insert gas, (i) pressuring the reactor to 10 Torr by adding a vaporous or gaseous silicon precursor with a carrier gas (e.g., comprising at least two pulses), (j) allowing the reactor pressure to stabilize, (k) agitating the reactor contents, (l) pumping out a subset of vapor or gaseous content and determining when to stop pumping based on analysis of content in reactor and (m) performing a sequence of pump-purge cycles of the reactor using insert gas. In some embodiments of the second exemplary method, the sequential steps (b)-(m) are optionally repeated one or more times to increase the total thickness of the one or more silicon oxide materials that enclose the solid core of the coated particles.

Some embodiments provide a method of preparing a pharmaceutical composition comprising coated particles comprising an active pharmaceutical ingredient enclosed by silicon oxide, the method comprising the sequential steps of: (a) providing uncoated particles comprising an active pharmaceutical ingredient (API); (b) performing atomic layer coating to apply a silicon oxide layer to uncoated particles comprising an active pharmaceutical ingredient thereby preparing coated particles comprising an active pharmaceutical ingredient enclosed by silicon oxide; (c) processing the coated particles to prepare a pharmaceutical composition wherein the processing comprising combining the particles with one or more pharmaceutically acceptable (e.g., acceptable in an oral drug product) excipients; and (d) processing the pharmaceutical composition to form a drug product (e.g., a pill, tablet or capsule). In some cases, the drug product is an oral drug product.

In some embodiments, the uncoated particles are at least 50% wt/wt API. In some embodiments, the uncoated particles are at least 70%, 80%, 90%, 99% or 100% wt/wt API. In some cases, the API is crystalline. In some embodiments, the coated particles have a D50 of 0.1 µm to 200 µm or 0.1 µm to 1 µm or 0.1 µm to 10 µm 0.1 µm to 50 µm on a volume average basis. In some embodiments, the coated particles have a D90 of 200 µm to 2000 µm on a volume average basis. In some embodiments, the uncoated particles have a D50 of 0.1 µm to 200 µm or 0.1 µm to 1 µm or 0.1 µm to 10 µm 0.1 µm to 50 µm on a volume average basis. In some embodiments, the uncoated particles have a D90 of 200 µm to 2000 µm on a volume average basis.

In some embodiments, the silicone oxide coating is a solid (pinhole-free) conformal coating.

In some embodiments, the step of performing atomic layer coating comprises: (b1) loading the particles comprising the drug into a reactor; (b2) applying a vaporous or gaseous catalyst to the particles in the reactor; (b3) performing one or more pump-purge cycles of the reactor using inert gas; (b4) applying a vaporous or gaseous silicon precursor to the particles in the reactor; and (b5) performing one or more pump-purge cycles of the reactor using inert gas. In some embodiments, steps (b2)-(b5) are performed two or more times to increase the total thickness of the silicon oxide layer before step (c) is performed.

In some embodiments, the reactor pressure is allowed to stabilize following step (b1), step (b2), and/or step (b4). In some embodiments, the reactor contents are agitated prior to and/or during step (b1), step (b3), and/or step (b5). In some embodiments, a subset of vapor or gaseous content is pumped out prior to step (b3) and/or step (b5). In some embodiments, step (b) takes place at a temperature between 35° C. and 50° C. In some embodiments, step (c) comprises combining the coated particles with one or more pharmaceutically acceptable excipients.

In some embodiments, the silicon oxide layer has a thickness in range of 0.1 nm to 100 nm or 0.1 nm to 10 nm or 0.1 nm to 50 nm.

Some embodiments provide a pharmaceutical composition comprising coated particles comprising an active pharmaceutical ingredient enclosed by silicon oxide, prepared by a method comprising the sequential steps of: (a) providing uncoated particles comprising an active pharmaceutical ingredient; (b) performing atomic layer coating to apply a silicon oxide layer to uncoated particles comprising an active pharmaceutical thereby preparing coated particles comprising an active pharmaceutical ingredient enclosed by silicon oxide; and (c) processing the coated particles to prepare a pharmaceutical composition.

In some embodiments, the step of performing atomic layer coating comprises:

(b1) loading the particles comprising the drug into a reactor; (b2) applying a vaporous or gaseous catalyst to the particles in the reactor; (b3) performing one or more pump-purge cycles of the reactor using inert gas; (b4) applying a vaporous or gaseous silicon precursor to the particles in the reactor; and (b5) performing one or more pump-purge cycles of the reactor using inert gas.

In some embodiments, steps (b2)-(b5) are performed two or more times to increase the total thickness of the silicon oxide layer before step (c) is performed. In some embodiments, the particles are agitated prior to and/or during step (a). In some embodiments, the reactor pressure is allowed to stabilize following step (b1), step (b2), and/or step (b4). In some embodiments, the reactor contents are agitated prior to and/or during step (b1), step (b3), and/or step (b5). In some embodiments, a subset of vapor or gaseous content is pumped out prior to step (b3) and/or step (b5). In some embodiments, step (b) takes place at a temperature between 35° C. and 50° C.

In some embodiments, the silicon oxide layer has a thickness in range of 0.1 nm to 100 nm. In some embodiments, the uncoated particles have a median particle size, on a volume average basis between 0.1 μm and 1000 μm.

In some embodiments, the coated particles comprising an active pharmaceutical ingredient further comprise one or more pharmaceutically acceptable excipients. In some embodiments, the uncoated particles consist of the active pharmaceutical ingredient.

Pharmaceutically Acceptable Excipients, Diluents, and Carriers

Pharmaceutically acceptable excipients include, but are not limited to:

(1) surfactants and polymers including: polyethylene glycol (PEG), polyvinylpyrrolidone (PVP), sodium lauryl sulfate, polyvinylalcohol, crospovidone, polyvinylpyrrolidone-polyvinylacrylate copolymer (PVPVA), cellulose derivatives, hydroxypropylmethyl cellulose, hydroxypropyl cellulose, carboxymethylethyl cellulose, hydroxypropylmethyl cellulose phthalate, polyacrylates and polymethacrylates, urea, sugars, polyols, carbomer and their polymers, emulsifiers, sugar gum, starch, organic acids and their salts, (2) binding agents such as cellulose, cross-linked polyvinylpyrrolidone, microcrystalline cellulose;

(3) filling agents such as lactose monohydrate, lactose anhydrous, microcrystalline cellulose and various starches;

(4) lubricating agents such as agents that act on the flowability of a powder to be compressed, including colloidal silicon dioxide, talc, stearic acid, magnesium stearate, calcium stearate, silica gel;

(5) sweeteners such as any natural or artificial sweetener including sucrose, xylitol, sodium saccharin, cyclamate, aspartame, and acesulfame K;

(6) flavoring agents;

(7) preservatives such as potassium sorbate, methylparaben, propylparaben, benzoic acid and its salts, other esters of parahydroxybenzoic acid such as butylparaben, alcohols such as ethyl or benzyl alcohol, phenolic chemicals such as phenol, or quaternary compounds such as benzalkonium chloride;

(8) buffers;

(9) diluents such as pharmaceutically acceptable inert fillers, such as microcrystalline cellulose, lactose, dibasic calcium phosphate, saccharides, and/or mixtures of any of the foregoing;

(10) wetting agents such as corn starch, potato starch, maize starch, and modified starches, and mixtures thereof;

(11) disintegrants; such as croscarmellose sodium, crospovidone, sodium starch glycolate; and

(12) effervescent agents such as effervescent couples such as an organic acid (e.g., citric, tartaric, malic, fumaric, adipic, succinic, and alginic acids and anhydrides and acid salts), or a carbonate (e.g., sodium carbonate, potassium carbonate, magnesium carbonate, sodium glycine carbonate, L-lysine carbonate, and arginine carbonate) or bicarbonate (e.g. sodium bicarbonate or potassium bicarbonate).

EXAMPLES

The following materials and methods were used in the Examples.

To apply a silicon oxide coating, tris(tert-pentoxy)silanol was used as the silicon precursor and tri-methyl aluminum (TMA) was used as a catalyst.

Method for ALC Coating

In brief, in one embodiment, the method for creating a silicon oxide coating comprised the sequential steps of:

(a) Loading particles comprising the drug (API) into a rotatory reactor;

(b) Pulsing TMA with a holding time of 10 seconds;

(c) Purging the reactor with an inert gas to remove TMA;

(d) Pulsing TPS using nitrogen as a carrier gas at 10 SCCM into the reactor, with a holding time of 1 minute to 1 hour (in some cases, TPS is also pulsed as multiple pulses continuously for 2-4 times);

(e) Purging the reactor with an inert gas to remove extra TPS.

In some cases, the steps of (b)-(e) were repeated more than once to increase the total thickness of the silicon oxide that enclose the drug particle core.

Example 1: Silicon Oxide Coating at 40° C.

API-1 and API-2 particles were coated with silicon oxide at 40° C. following the methods described in Table 1 below:

TABLE 1

| ID | Cycle # | T | TMA | TPS | TMA hold | TPS hold | Thickness TEM | TGA | API |
|---|---|---|---|---|---|---|---|---|---|
| TPS-32 | 12 | 40° C. | 1 torr | 30 torr, carrier 10 sccm N₂ (4 micro-pulses) | 10 s | 10 min | 5 nm, | 2.52% | 1 g of API-1 |
| TPS-35 | 10 | 40° C. | 1 torr | 30 torr, carrier 10 sccm N₂ (4 micro-pulses) | 10 s | 10 min | 3-3.5 nm | 0.89% | 1.9 g API-2 |

TPS-32: API-1 or Silicon Wafer

In step (a), 1 gram of API-1 was loaded to the rotatory reactor (rotating at 10-100 rpm). The rotatory reactor is beneficial because it can better expose the API particles to catalyst and precursor. As a control experiment, a silicon wafer (silicon wafer) was loaded to the rotatory reactor instead of the API.

In step (b), the catalyst TMA was pulsed into the reactor at about 1 torr, with a holding time of 10 seconds and a reaction temperature of 40° C. After the 10-second holding time, in step (c), the reactor was purged using an inert gas to remove excessive TMA. In step (d), the silicon precursor TPS was pulsed into the reactor at about 30 torr, using 10 sccm nitrogen as the carrier gas, with a reaction temperature of 40° C. The TPS was pulsed in four separate micro-pulses, each micro-pulse having a holding time of 10 minutes. After the last 10-minute holding time, in step (e), the reactor was purged using an inert gas to remove excessive TPS. Steps (b)-(e) were repeated 12 times.

TPS-35: API-2 or Silicon Wafer

In step (a), 1.9 gram of API-2 was loaded to the rotatory reactor (rotating at 10-100 rpm). The rotatory reactor is beneficial because it can better expose the API particles to catalyst and precursor. As a control experiment, a silicon wafer (silicon wafer) was loaded to the rotatory reactor instead of the API.

In step (b), the catalyst TMA was pulsed into the reactor at about 1 torr, with a holding time of 10 seconds and a reaction temperature of 40° C. After the 10-second holding time, in step (c), the reactor was purged using an inert gas to remove excessive TMA. In step (d), the silicon precursor TPS was pulsed into the reactor at about 30 torr, using 10 sccm nitrogen as the carrier gas, with a reaction temperature of 40° C. The TPS was pulsed in four separate micro-pulses, each micro-pulse having a holding time of 10 minutes. After the last 10-minute holding time, in step (e), the reactor was purged using an inert gas to remove excessive TPS. Steps (b)-(e) were repeated 10 times.

Fourier Transform Infrared Spectroscopy (FTIR) Analysis

Figure 2A:
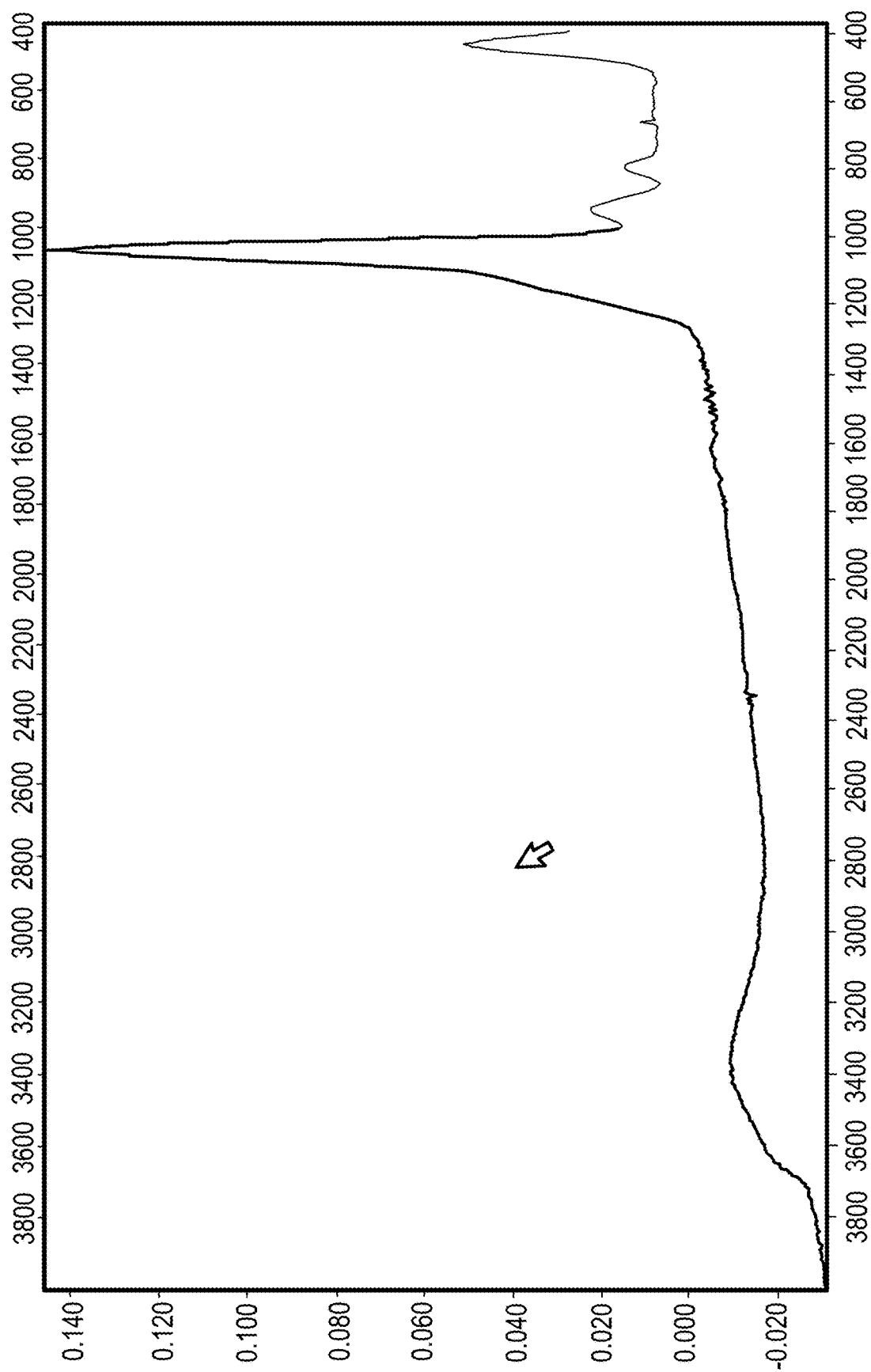
FIG. 2A shows the FTIR spectrum of the silicon oxide coating on the silicon wafer (in the TPS-32 experiment).
Figure 2B:
FIG. 2B shows the FTIR spectrum of the silicon oxide coating on the silicon wafer (in the TPS-35 experiment).

FIG. 2A shows the FTIR spectrum of the silicon oxide coating on the silicon wafer in the TPS-32 experiment. FIG. 2B shows the FTIR spectrum of the silicon oxide coating on the silicon wafer in the TPS-35 experiment. As shown in FIGS. 2A-2B, there are peaks corresponding to a silicon oxide layer on the silicon wafer in both the TPS-32 experiment and the TPS-35 experiment.

Transmission Electron Microscopy (TEM) Analysis

Figure 3A:
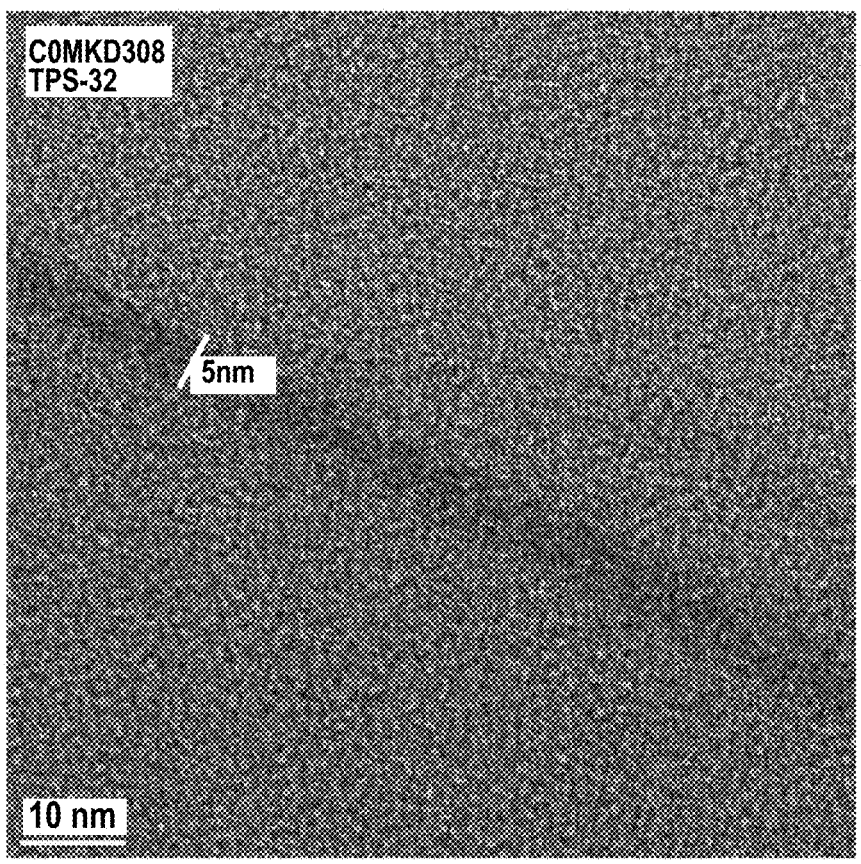
FIGS. 3A-3B show the cross-section TEM images of the silicon oxide coating on the API particles.
Figure 3B:
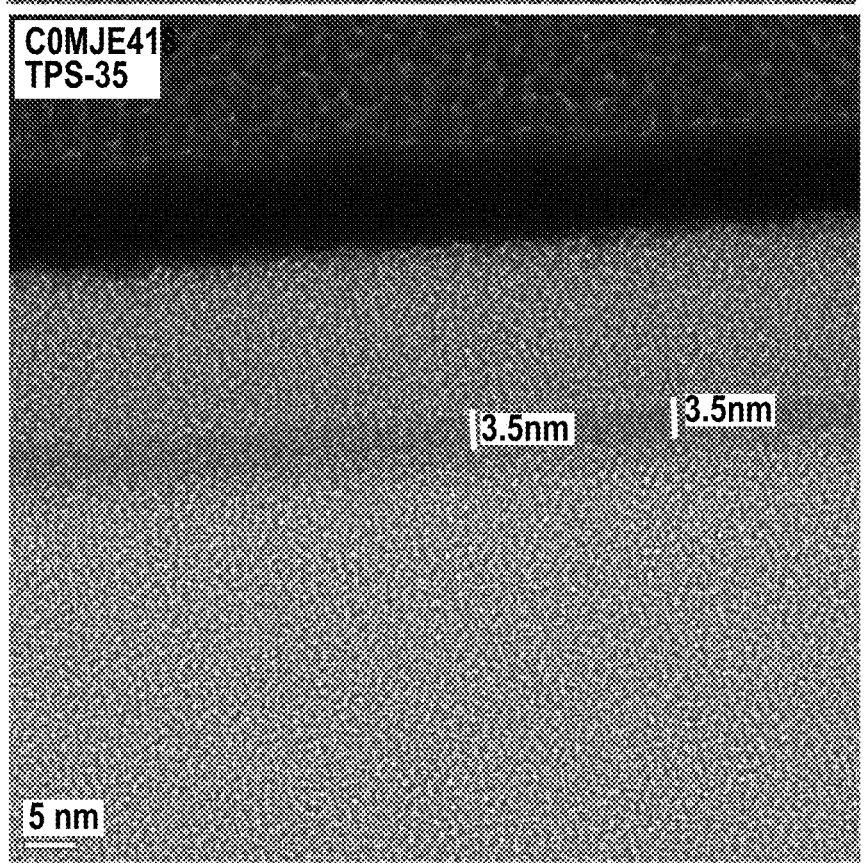

FIGS. 3A-3B show the cross-section TEM images of the silicon oxide coating on the API particles. FIG. 3A shows the cross-section TEM image of TPS-32 (API-1) and FIG. 3B shows the cross-section TEM image of TPS-35 (API-2). The TEM image shows a coating layer of about 3.5-5 nm on the coated API particles.

Secondary Ion Mass Spectrometry (SIMS) Depth Profile Analysis

Figure 4:
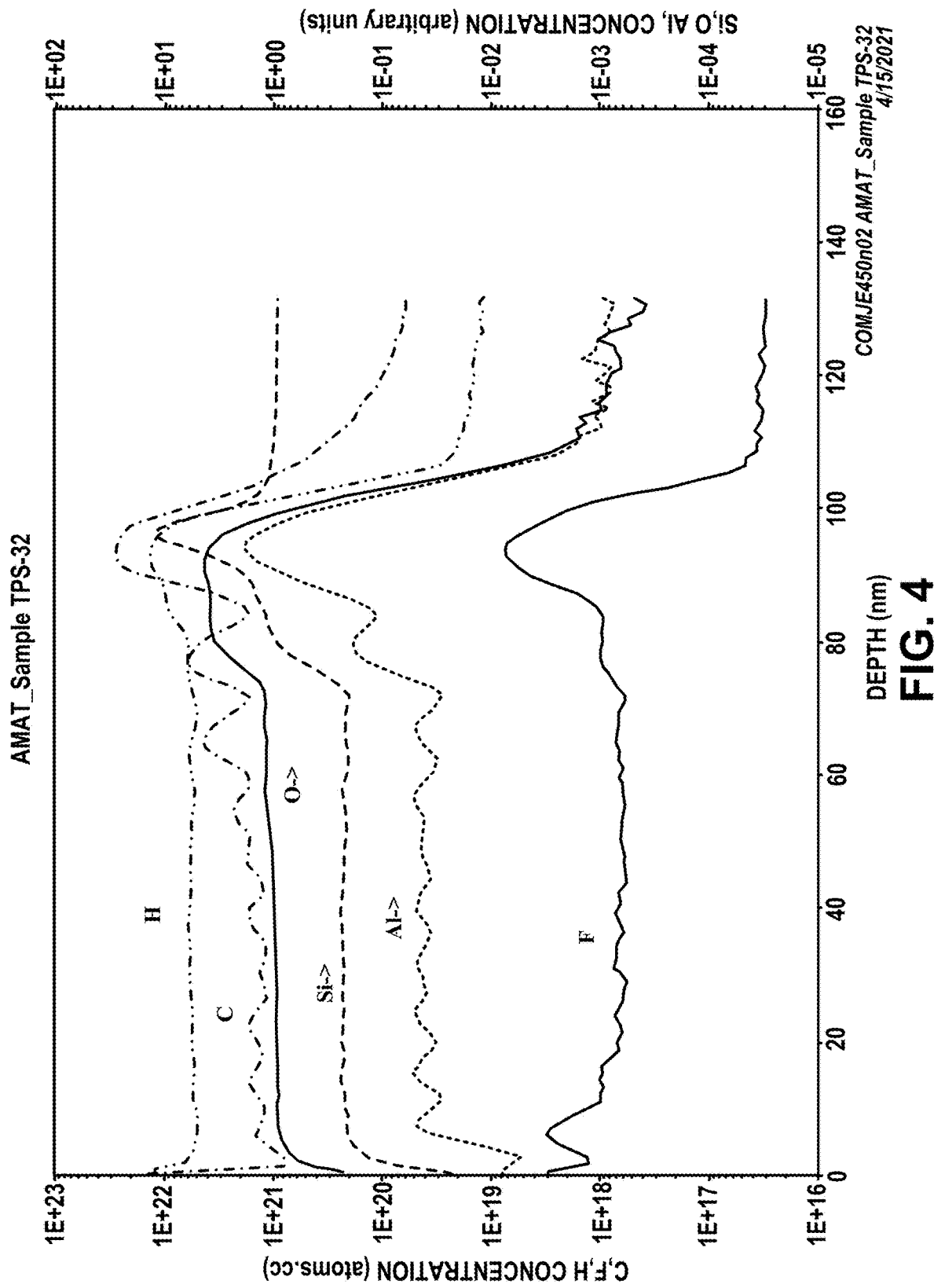
FIG. 4 shows the SIMS depth profile of the silicon oxide coating on the silicon wafer (H, C, and F analysis, with Si, O and Al plotted as raw ion counts).

FIG. 4 shows the SIMS depth profile on silicon wafer (H, C, and F analysis, with Si, O and Al plotted as raw ion counts). The SIMS depth profile shows a silicon oxide layer (Si and O), containing aluminum (Al), hydrogen (H), carbon (C) and fluorine (F).

Figure 5:
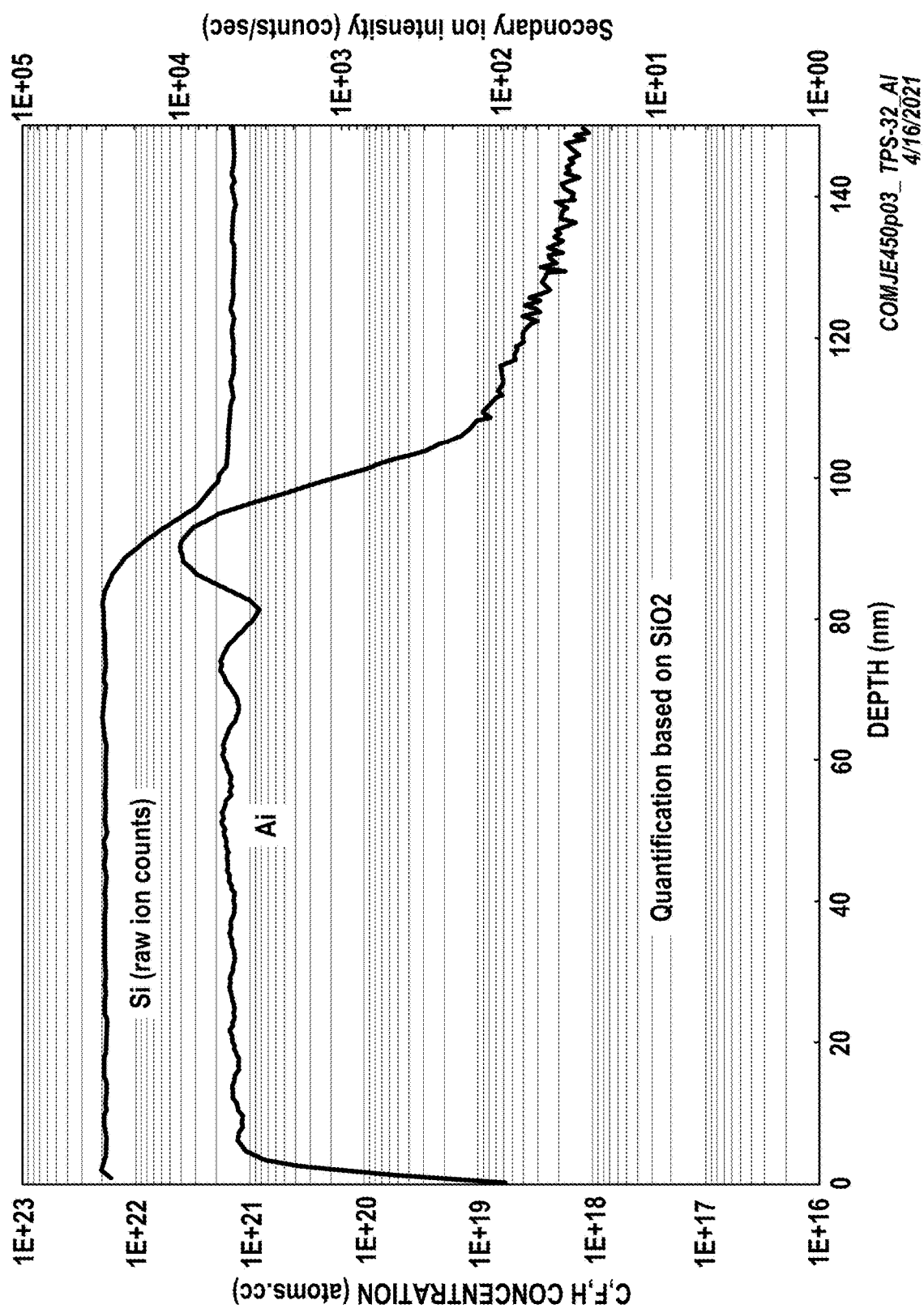
FIG. 5 shows the SIMS depth profile of the silicon oxide coating on the silicon wafer (Al analysis with Si plotted as raw ion counts).

FIG. 5 shows the SIMS depth profile on silicon wafer (Al analysis with Si plotted as raw ion counts). Based on analysis under different conditions, this sample is mostly $SiO_2$, with ~2% Al in most of the layer (based on quantification in $SiO_2$). The Al concentration changes in the layer, with 10 "peaks", corresponding to 10 cycles of the coating process. The Al shows the highest concentration at film/substrate interface region.

X-Ray Photoelectron Spectroscopy (XPS) Analysis

Table 2 shows the XPS data on the silicon wafer (in the TPS-35 experiment).

TABLE 2

| Sample ID | C | N | O | Na | Al | Si |
|---|---|---|---|---|---|---|
| Sample TPS 35 | 1.9 | 0.1 | 66.9 | — | 0.3 | 30.8 |

Figure 6:
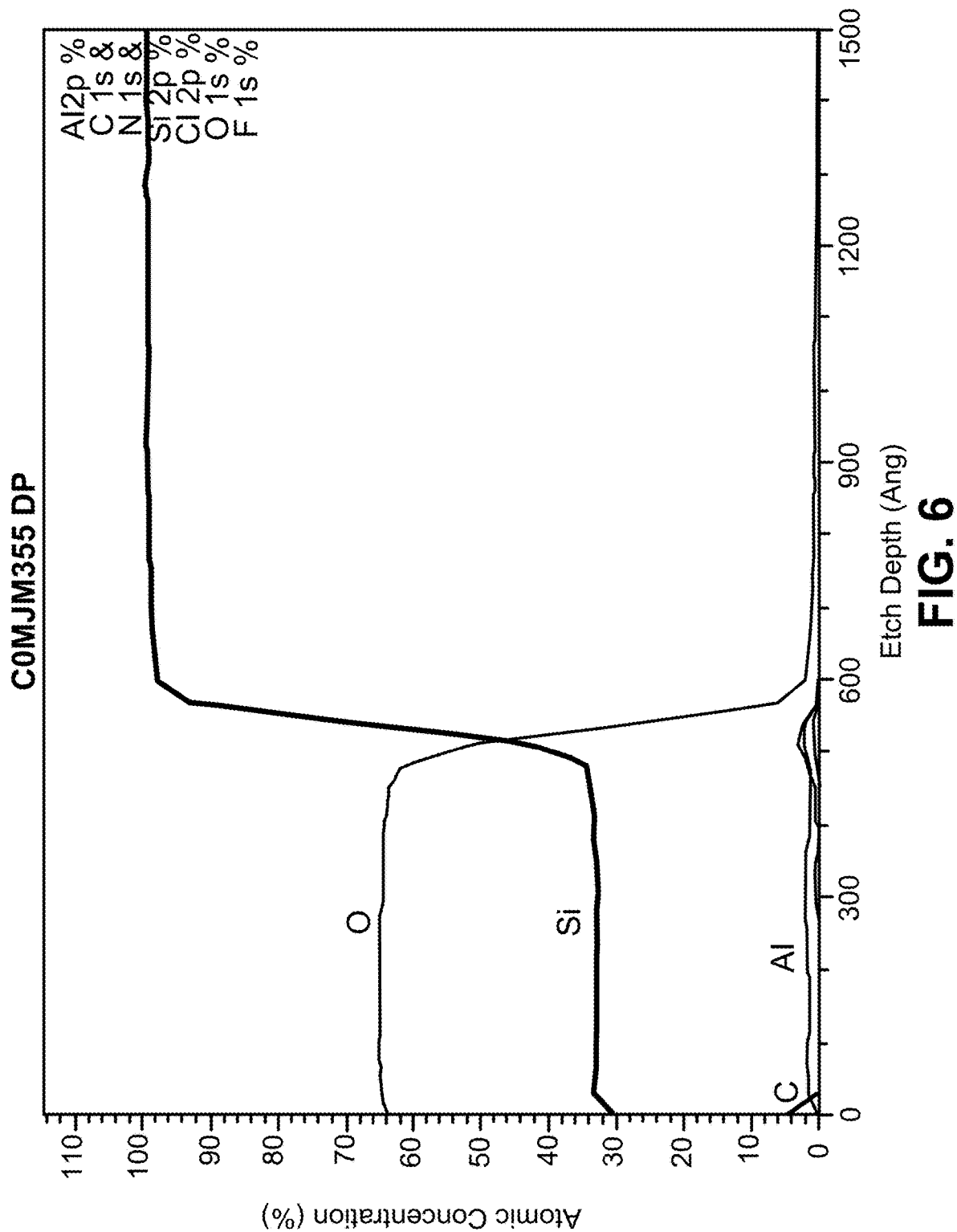
FIG. 6 shows the XPS depth profile of the silicon oxide coating on the silicon wafer (in the TPS-35 experiment).

Table 2 shows atomic concentrations in atomic %. The data in Table 2 are normalized to 100% of the elements detected. XPS does not detect H or He. A dash line "—" indicates the element is not detected. The data in Table 2 suggests that the coating on the silicon wafer is mainly $SiO_2$. Low carbon and some oxygen are likely caused by adventitious organics from exposure to air. Traces of nitrogen (likely as N—O) and aluminum were also present at the surface. While spectra were collected for F and Cl in the depth profile (see FIG. 4). Neither element was detected by XPS. FIG. 6 shows XPS depth profile of silicon wafer (in the TPS-35 experiment). The XPS depth profile is consistent with mainly $SiO_2$ on elemental Si.

Example 2: Silicon Oxide Coating at 80° C.

API-1 was coated with silicon oxide at 80° C. following the methods described in Table 3 below:

TABLE 3

| ID | Cycle # | T (C.) | TMA | TPS | TMA Hold | TPS hold | TGA |
|---|---|---|---|---|---|---|---|
| TPS 43 | 40 | 80 | 1 torr | 60 torr carrier 10 sccm N₂ | 10 s | 20 min | 1.04% |
| TPS-44 | 14 | 80 | 1 torr | 60 torr carrier 10 sccm N₂ | 10 s | 1 hr | 1.04% |
| TPS-45 | 30 | 80 | 1 torr | 60 torr carrier 10 sccm N2 (3 micro-pulses, 100 sccm purge N2) | 10 s | 10 min | 4.58% |

TPS-43: API-1 or Silicon Wafer

In step (a), 1 gram of API-1 was loaded to the rotatory reactor (rotating at 10-100 rpm). The rotatory reactor is beneficial because it can better expose the API particles to catalyst and precursor. As a control experiment, a silicon wafer (silicon wafer) was loaded to the rotatory reactor instead of the API.

In step (b), the catalyst TMA was pulsed into the reactor at about 1 torr, with a holding time of 10 seconds and a reaction temperature of 80° C. After the 10-second holding time, in step (c), the reactor was purged using an inert gas to remove excessive TMA. In step (d), the silicon precursor TPS was pulsed into the reactor at about 60 torr, using 10 sccm nitrogen as the carrier gas, with a holding time of 20 minutes and a reaction temperature of 80° C. After the 20-minute holding time, in step (e), the reactor was purged using an inert gas to remove excessive TPS. Steps (b)-(e) were repeated 40 times.

TPS-44: API-1 or Silicon Wafer

In step (a), 1 gram of API-1 was loaded to the rotatory reactor (rotating at 10-100 rpm). The rotatory reactor is beneficial because it can better expose the API particles. As a control experiment, a silicon wafer (silicon wafer) was loaded to the rotatory reactor instead of the API.

In step (b), the catalyst TMA was pulsed into the reactor at about 1 torr, with a holding time of 10 seconds and a reaction temperature of 80° C. After the 10-second holding time, in step (c), the reactor was purged using an inert gas to remove excessive TMA. In step (d), the silicon precursor TPS was pulsed into the reactor at about 60 torr, using 10 sccm nitrogen as the carrier gas, with a holding time of 1 hour and a reaction temperature of 80° C. After the 1-hour holding time, in step (e), the reactor was purged using an inert gas to remove excessive TPS. Steps (b)-(e) were repeated 14 times.

TPS-45: API-1 or Silicon Wafer

In step (a), 1 gram of API-1 was loaded to the rotatory reactor (rotating at 10-100 rpm). The rotatory reactor is beneficial because it can better expose the API particles. As a control experiment, a silicon wafer (silicon wafer) was loaded to the rotatory reactor instead of the API.

In step (b), the catalyst TMA was pulsed into the reactor at about 1 torr, with a holding time of 10 seconds and a reaction temperature of 80° C. After the 10-second holding time, in step (c), the reactor was purged using an inert gas to remove excessive TMA. In step (d), the silicon precursor TPS was pulsed into the reactor at about 60 torr, using 10 sccm nitrogen as the carrier gas, and a reaction temperature of 80° C. The TPS was pulsed in three separate micro-pulses, each micro-pulse having a holding time of 10 minutes. After the last 10-minute holding time, in step (e), the reactor was purged using an inert gas to remove excessive TPS. Steps (b)-(e) were repeated 30 times.

XPS Analysis

Table 4 shows the XPS data on the API particles (in the TPS-43, TPS-44 and TPS-45 experiments).

TABLE 4

| Sample | C | N | O | F | Al | Si |
|---|---|---|---|---|---|---|
| TPS-43 | 27.4 | 2.8 | 51.1 | 0.1 | 11.1 | 7.6 |
| TPS-44 | 47.9 | 5.4 | 36.5 | ? | 7.6 | 2.6 |
| TPS-45 | 15.3 | 1.8 | 60.7 | 0.1 | 13.5 | 8.7 |

Table 4 shows atomic concentrations in atomic %. The data in Table 4 are normalized to 100% of the elements detected. XPS does not detect H or He. A question mark "?" indicates species may be present at or near the detection limit of the measurement.

As shown in Table 4, the levels of AlOx and SiOx were found the highest on TPS-45 and lowest on TPS-44, likely indicating the thickest (TPS-45) and thinnest (TPS-44) surface coating.

TEM Analysis

Figure 7:
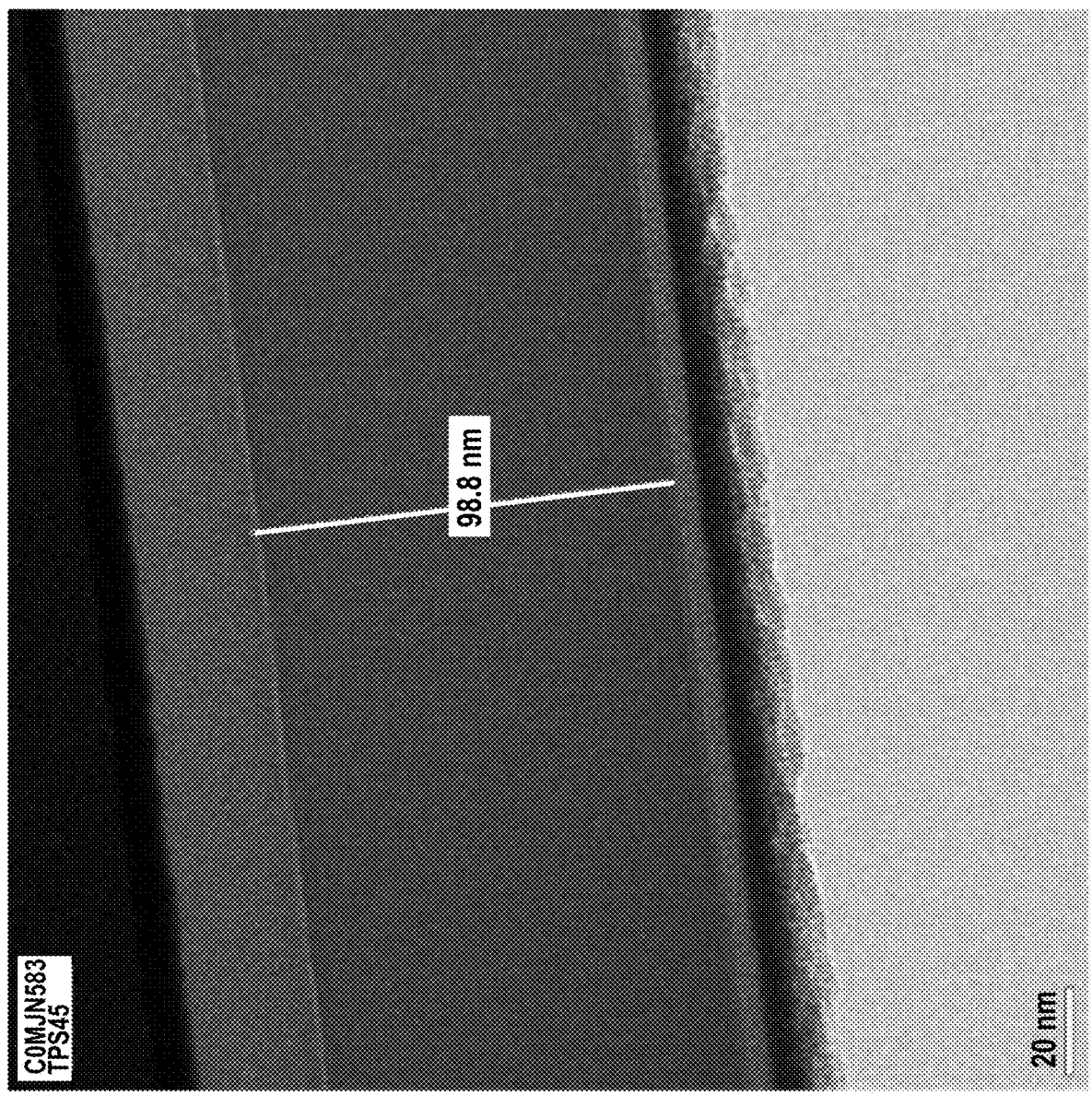
FIG. 7 shows the cross-section TEM image of the silicon oxide coating on the coated API (in the TPS-45 experiment).

FIG. 7 shows the cross-section TEM image of the coated API (in the TPS-45 experiment). As shown in FIG. 7, there is a SiO2 layer of about 100 nm thick on the coated API particles.

EDS Analysis

Figure 8:
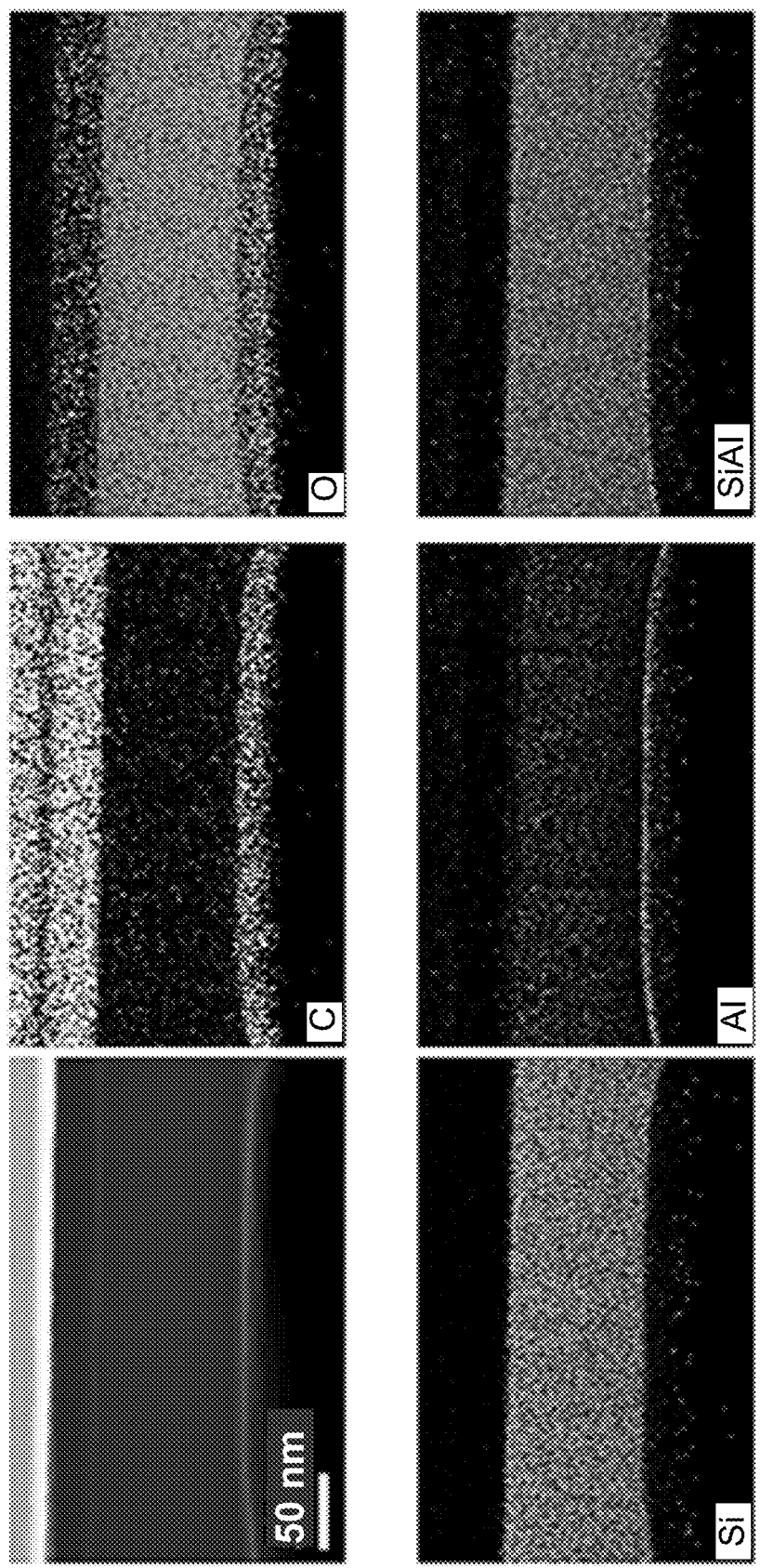
FIG. 8 shows the EDS mapping of silicon oxide coating on the coated API (API-1).

FIG. 8 shows the EDS mapping of the coated API. As shown in FIG. 8, most of the AlOx is located at the interface between the silicon oxide coating and the API particle.

What is claimed is:

1. A method of preparing a pharmaceutical composition comprising silicon oxide coated particles comprising an active pharmaceutical ingredient (API) enclosed by one or more silicon oxide layers, the method comprising the sequential steps of:
   (a) providing particles comprising an API;
   (b1) loading the particles comprising the API into a reactor;
   (b2) applying a vaporous or gaseous catalyst to the particles in the reactor by pulsing the vaporous or gaseous catalyst into the reactor, wherein the catalyst is trimethylaluminium (TMA);
   (b3) performing two or more pump-purge cycles of the reactor using an inert gas, wherein each cycle comprises flowing an inert gas into the reactor to a pressure of 1-100 torr and after a delay time evacuating the reactor to reduce the pressure of the inert gas to below 1 torr;
   (b4) applying a vaporous or gaseous silicon precursor to the particles in the reactor by pulsing the vaporous or gaseous silicon precursor into the reactor, wherein the silicon precursor is Tris(tert-pentoxy)silanol (TPS);
   (b5) performing two or more pump-purge cycles of the reactor using an inert gas, wherein each cycle comprises flowing an inert gas into the reactor to a pressure of 1-100 torr and after a delay time evacuating the reactor to reduce the pressure of the inert gas to below 1 torr; and
   (c) processing the coated particles to prepare a pharmaceutical composition, wherein steps (b2)-(b5) takes place at a temperature between 40° C. and 80° C., wherein step (b4) comprises four or more separate micro-pulses of TPS and each micro-pulse has a holding time between 1 minute and 1 hour, wherein the particles in step (a) have a median particle size, on a volume average basis between 0.1 μm and 1000 μm.

2. The method of claim 1, wherein the particles in step (a) are crystalline.

3. The method of claim 1, wherein the silicon oxide coating constitutes at least 5% of the total weight of the coated particles.

4. The method of claim 1, wherein the API is an organic compound.

5. The method of claim 1, wherein steps (b2)-(b5) are performed at least four times providing a first, second, third and fourth cycle.

6. The method of claim 1, wherein a subset of vapor or gaseous content is pumped out prior to step (b3) and/or step (b5).

7. The method of claim 1, wherein the silicon oxide layer on the coated particles has a thickness in the range of 0.1 nm to 120 nm.

8. The method of claim 7, wherein the silicon oxide layer on the coated particles has a thickness in the range of 50 nm to 120 nm.

9. The method of claim 1, wherein step (c) comprises combining the coated particles with one or more pharmaceutically acceptable excipients.

10. The method of claim 1, wherein step (b2) comprises a holding time in the range of 5 seconds to 20 seconds.

11. The method of claim 1, wherein the provided particles are uncoated.

12. The method of claim 1, wherein the provided particles are coated with aluminum oxide.

13. The method of claim 1, wherein step (b1) further comprises agitating the API.

14. A pharmaceutical composition prepared by the method of claim 1.

15. The method of claim 1, wherein the silicon oxide coating is free of HCl and Cl.

16. The method of claim 1, wherein the particles in step (a) have a D50 of 0.1 μm to 200 μm.

17. The method of claim 1, wherein the particles in step (a) have a D50 of 0.1 μm to 50 μm.

18. The method of claim 1, wherein the silicon oxide coating is conformal.

19. The method of claim 1, wherein the silicon oxide coating is pin-hole free.

* * * * *